United States Patent
Kojima et al.

(10) Patent No.: US 9,845,001 B1
(45) Date of Patent: Dec. 19, 2017

(54) GLASS RUN FOR AUTOMOBILE DOOR

(71) Applicant: Nishikawa Rubber Co., Ltd., Hiroshima (JP)

(72) Inventors: Masahiro Kojima, Hiroshima (JP); Kousuke Mori, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 15/497,971

(22) Filed: Apr. 26, 2017

(30) Foreign Application Priority Data

May 31, 2016 (JP) .................. 2016-108512

(51) Int. Cl.
 *E06B 7/16* (2006.01)
 *B60J 10/76* (2016.01)
 *B60J 5/04* (2006.01)

(52) U.S. Cl.
 CPC ............. *B60J 10/76* (2016.02); *B60J 5/0402* (2013.01)

(58) Field of Classification Search
 CPC ................................ B60J 10/76; B60J 5/0402
 USPC ......................................................... 49/479.1
 See application file for complete search history.

(56) References Cited

U.S. PATENT DOCUMENTS

| | | | | |
|---|---|---|---|---|
| 3,813,815 A | * | 6/1974 | Baermann | F16J 15/00 49/478.1 |
| 5,566,510 A | * | 10/1996 | Hollingshead | B29C 45/14409 49/475.1 |
| 6,237,287 B1 | * | 5/2001 | Nakagawa | B60J 10/21 49/479.1 |
| 6,240,677 B1 | * | 6/2001 | Baumann | B60J 10/79 49/479.1 |
| 8,051,606 B2 | * | 11/2011 | Maaβ | B60J 10/21 49/479.1 |
| 8,157,270 B2 | * | 4/2012 | Tsou | F01D 11/003 277/644 |
| 8,458,959 B2 | * | 6/2013 | Ohtake | B60J 5/0402 49/479.1 |
| 8,464,472 B2 | * | 6/2013 | Araki | F16J 15/061 49/479.1 |
| 8,479,449 B2 | * | 7/2013 | Titz | B60J 10/78 49/440 |

(Continued)

FOREIGN PATENT DOCUMENTS

| | | |
|---|---|---|
| JP | 2004-067091 A | 3/2004 |
| JP | 2013-184627 A | 9/2013 |

(Continued)

*Primary Examiner* — Jerry E Redman
(74) *Attorney, Agent, or Firm* — Alston & Bird LLP (57) ABSTRACT

Disclosed is a glass run in which a cover is not easily detached from a window frame, thereby ensuring safety and good appearance, while reducing the number of components and costs. A protruding portion 25 protruding in a longitudinal direction of a vehicle along an upper part of a window frame 3 is provided at a corner 27 of a glass run 1. The protruding portion 25 includes an outer cover 25a covering an outside, in a widthwise direction of a vehicle, of an angled portion A of the window frame 3, an inner cover 25b covering an inside, in the widthwise direction of the vehicle, of the angled portion A, and a connecting portion 25c connecting the outer cover 25a and the inner cover 25b to each other. The connecting portion 25c is inserted in, and assembled to, a notch 3e of the window frame 3.

5 Claims, 10 Drawing Sheets

(56) References Cited

U.S. PATENT DOCUMENTS

| | | | |
|---|---|---|---|
| 8,490,334 B2* | 7/2013 | Miura | B60J 10/21 49/441 |
| 8,667,738 B2* | 3/2014 | Kondo | B60J 10/36 49/440 |
| 8,991,102 B2* | 3/2015 | Minagawa | E06B 7/2305 49/479.1 |
| 2002/0139054 A1* | 10/2002 | Schlachter | B60J 10/88 49/479.1 |
| 2004/0111973 A1 | 6/2004 | Moisy et al. | |
| 2004/0177562 A1* | 9/2004 | Deguchi | B60J 5/00 49/479.1 |
| 2004/0216384 A1* | 11/2004 | Teramoto | B60J 10/24 49/479.1 |
| 2006/0162256 A1* | 7/2006 | Tsuchida | B60J 10/79 49/479.1 |
| 2013/0232881 A1 | 9/2013 | Adachi et al. | |
| 2014/0059940 A1* | 3/2014 | Eguchi | B60J 10/0017 49/479.1 |

FOREIGN PATENT DOCUMENTS

| | | | |
|---|---|---|---|
| JP | 2015-067112 A | 4/2015 | |
| WO | WO 2008133115 A1 * | 11/2008 | B60J 5/0402 |

* cited by examiner

GLASS RUN FOR AUTOMOBILE DOOR

CROSS-REFERENCE TO RELATED APPLICATION

This application claims priority to and the benefit of Japanese Patent Application No. 2016-108512 filed on May 31, 2016, the contents of which as are hereby incorporated by reference in their entirety.

BACKGROUND

Technical Field

The present disclosure relates to a glass run arranged at a window frame of an automobile door. In particular, the disclosure belongs to a technical field in which a glass run is assembled to a window frame from outside a cabin.

Description of Related Art

There are types of doors provided at a side of an automobile, one of which is a door having a window frame which holds a periphery of a window glass. Such a door having a window frame is provided with a glass run for sealing a gap between the window frame and the window glass.

The glass runs disclosed in Patent Document 1 (Japanese Unexamined Patent Publication No. 2013-184627) and Patent Document 2 (Japanese Unexamined Patent Publication No. 2015-67112) are assembled to the window frame from outside the cabin. Such a glass run disclosed in these documents, which is attached to the window frame from outside the cabin, is called a hidden type which covers and hides part of the window frame from outside the cabin. This type of the glass run may sometimes be adopted due to design requirements of a vehicle, for example.

The glass run of Patent Document 1 includes an upper portion extending in a longitudinal direction of a vehicle, a rear vertical portion extending downward from a rear portion of the upper portion, and a corner engagement portion extending rearward from a corner formed between the upper portion and the rear vertical portion. A hook-shaped engagement projection is provided near a rear end portion of the corner engagement portion. The engagement projection engages, from inside the cabin, with an upper portion of a garnish attached to an outer side of window frame.

Further, the glass run of Patent Document 2, too, includes an upper portion and a rear vertical portion. An attachment extension extends rearward from the corner formed between the upper portion and the rear vertical portion. The attachment extension is provided with an attachment hole in which a clip is inserted. The clip inserted in the attachment hole is inserted in a hole in a window frame, thereby fixing the attachment extension to the window frame.

In Patent Document 1, the corner engagement portion extending rearward from said corner is made of an elastic material. This corner engagement portion covers an angled portion at an upper part of the window frame, which is safer for users and suitable in terms of better appearance than in a case where the angled portion at the upper part of the window frame is not covered. Similarly, in Patent Document 2, too, the attachment extension covers the angled portion at the upper part of the window frame, which is suitable in terms of the safety and good appearance.

Figure 1:
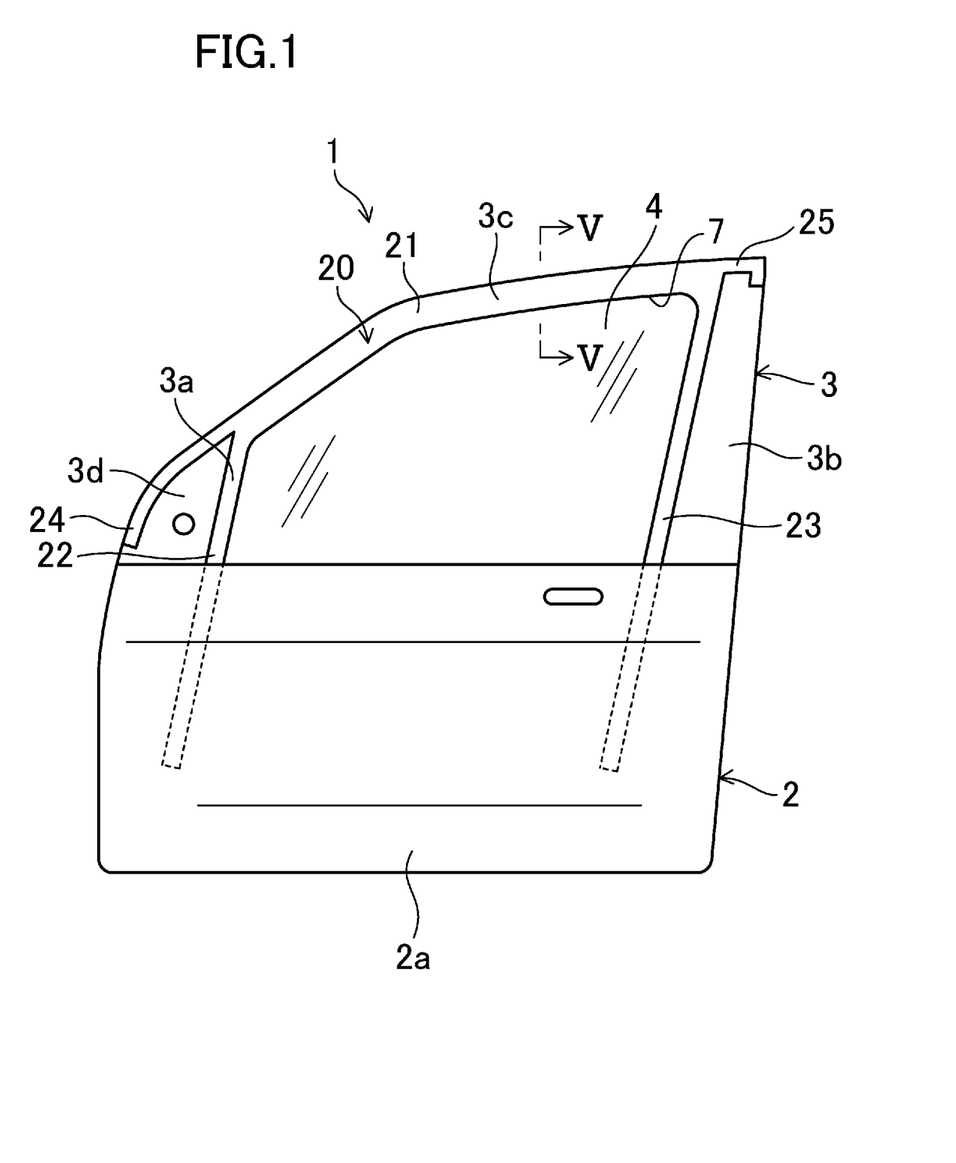
FIG. 1 is a left side view of a left-side front door.

However, in Patent Document 1, the hook-shaped engagement projection, which is integrally formed with the corner engagement portion, is merely engaged with the upper portion of the garnish from inside the cabin, as illustrated in FIG. 1. One of various situations where the door is used by a user may be, for example, that the user puts a hand on the corner engagement portion to apply force to the door to open and close the door. Such external force applied to the corner engagement portion may easily deform the engagement projection integrally formed with the corner engagement portion, since the corner engagement portion is made of an elastic material, and the engagement projection may come off from the upper portion of the garnish. If this occurs, the appearance deteriorates.

To cope with this problem, a clip may be used, as in the fixing structure of the attachment extension disclosed in Patent Document 2. However, such a structure may increase the number of components, make the workability worse in assembly, and result in increase in costs. In addition, the clip disclosed in Patent Document 2 is simply inserted in the hole of the window frame. Hence, the clip may be pulled out from the hole if the above-mentioned external force is applied.

Alternatively, an adhesive tape or other alternatives may be used instead of the clip to fix the attachment extension disclosed in Patent Document 2 to the window frame. However, such a structure, too, may increase the number of components (since the adhesive tape is necessary), reduce the workability in assembly, and result in increase in costs. Further, if the adhesive tape is used, there is a concern about degradation of the adhesion over time.

BRIEF SUMMARY

In view of the forgoing background, it is therefore an objective of the present disclosure to provide a corner of a glass run, which is assembled to a window frame from outside the cabin, with a cover which covers an angled portion of the window frame and is not easily detached from the window frame to ensure safety and good appearance while reducing the number of components and costs.

To achieve the above objective, the present disclosure provides a configuration in which an angled portion at an upper part of a window frame is covered by outer and inner covers from outside and inside in the widthwise direction of the vehicle, and in which a connecting portion connecting the outer cover and the inner cover to each other is inserted in, and thereby assembled to, a notch formed in a door member comprising an automobile door.

A first aspect of the present disclosure is directed to: a glass run for an automobile door, the glass run being assembled to a window frame, which forms a window opening of the automobile door, from an outside of a cabin to seal a gap between the window frame and a window glass, wherein the glass run for the automobile door includes: an upper portion extending in a longitudinal direction of a vehicle along an upper part of the window frame; a vertical portion extending downward from an end, in the longitudinal direction of the vehicle, of the upper portion; and a protruding portion protruding in the longitudinal direction of the vehicle from a corner formed at a boundary between the upper portion and the vertical portion along the upper part of the window frame, wherein still further the protruding portion includes: an outer cover covering an outside, in a widthwise direction of the vehicle, of an angled portion at the upper part of the window frame; an inner cover covering an inside, in the widthwise direction of the vehicle, of the angled portion at the upper part of the window frame; and a connecting portion extending from the outer cover to the inner cover to connect the outer cover and the inner cover to each other, and wherein the connecting portion is inserted in, and assembled to, a notch formed at a door member comprising the automobile door.

According to this configuration, in a state in which the glass run is assembled to the window frame, the angled portion at the upper part of the window frame is covered by the outer and inner covers of the glass run from outside and inside in the widthwise direction of the vehicle, respectively. The angled portion of the window frame is therefore not exposed, which increases the safety and provides good appearance.

In the state in which the angled portion at the upper part of the window frame is covered with the outer and inner covers, the connecting portion extending from the outer cover to the inner cover is inserted in, and assembled to, the notch of the door member. Thus, the outer cover is less likely to be detached from the door member even when, for example, a hand is placed on the outer cover to apply force to the door to open and close the door, since the outer cover is connected to the inner cover via the connecting portion, which is assembled to the notch of the door member. Similarly, the inner cover is less likely to be detached from the door member even when, for example, a hand is placed on the inner cover to apply force to the door to open and close the door, since the inner cover is connected to the outer cover via the connecting portion, which is assembled to the notch of the door member.

In other words, the outer cover and the inner cover remain assembled without a clip or an adhesive tape even when external force is applied to the outer cover or the inner cover. The number of components and costs may thus be reduced. Further, there is no concern about degradation of adhesion over time as in the case where the adhesive tape is used.

A second aspect of the present disclosure is an embodiment of the first aspect. Specifically in the second aspect, the door member is a panel member comprising the window frame, and the connecting portion is inserted in, and assembled to, a notch formed at the panel member.

According to this configuration, the outer and inner covers, which cover the window frame, and the connecting portion, which connects the outer and inner covers to each other, are assembled to a single member, that is, the window frame. The outer and inner covers and the connecting portion may thus be smoothly assembled.

A third aspect of the present disclosure is an embodiment of the second aspect. Specifically in the third aspect, a gap between the outer cover and the inner cover is open to one side of the vehicle in the longitudinal direction, and the connecting portion is inserted in, and assembled to, a notch formed at the panel member, the notch being open to the other side of the vehicle in the longitudinal direction.

According to this configuration, in order to assemble the outer and inner covers to the window frame, the panel member is inserted in a gap, where the outer cover and the inner cover are not connected to each other, from one side to the other side of the vehicle in the longitudinal direction. Since the notch formed at the panel member is open to the other side of the vehicle in the longitudinal direction, the connecting portion can be inserted in the notch from the same insertion direction of the panel member in assembly of the outer cover and the inner cover.

A fourth aspect of the present disclosure is an embodiment of the first aspect. Specifically in the fourth aspect, the door member is a garnish attached to the window frame, and the connecting portion is inserted in, and assembled to, a notch formed at the garnish.

According to this configuration, if a garnish comprising the automobile door is attached to the outside, in the widthwise direction of the vehicle, of the window frame, the connecting portion is assembled to this garnish.

A fifth aspect of the present disclosure is an embodiment of the first aspect. Specifically in the fifth aspect, the connecting portion is formed so as to be fitted to a periphery of the notch.

According to this configuration, the connecting portion is less likely to be detached from the notch, which reduces displacement of the outer and inner covers.

According to the first aspect, an angled portion at an upper part of a window frame is covered by outer and inner covers, and a glass run is provided with a connecting portion connecting the outer cover and the inner cover to each other. The connecting portion is inserted in, and thereby assembled to, a notch formed in a door member comprising an automobile door. Thus, the outer cover and the inner cover are not easily detached from the window frame without requiring clips and an adhesive tape, which can ensure safety and good appearance while reducing the number of components and costs.

According to the second aspect, since the connecting portion is assembled to the notch formed at the panel members comprising the window frame, it is possible to assemble the outer and inner covers and the connecting portion to the single member smoothly, and hence to further improve the workability in assembly.

According to the third aspect, the gap between the outer cover and the inner cover is open to one side of the vehicle in the longitudinal direction thereof, and the notch is formed in the panel member so as to open to the other side of the vehicle in the longitudinal direction thereof. Thus, when assembling the outer and inner covers to the panel member, the connecting portion can be inserted in, and assembled to, the notch from the same direction in which the panel member is inserted in the gap between the outer and inner covers. Consequently, the workability in assembly may be further improved.

According to the fourth aspect, the connecting portion can be assembled to a garnish comprising the automobile door.

According to the fifth aspect, since the connecting portion is formed so as to be fitted to the periphery of the notch, the outer and inner covers may be positioned with respect to the door member.

DETAILED DESCRIPTION OF VARIOUS EMBODIMENTS

Embodiments of the present disclosure will be described in detail below with reference to the drawings. The following description of advantageous embodiments is only an example in nature, and is not intended to limit the scope, applications or use of the present disclosure.

First Embodiment

Figure 3:
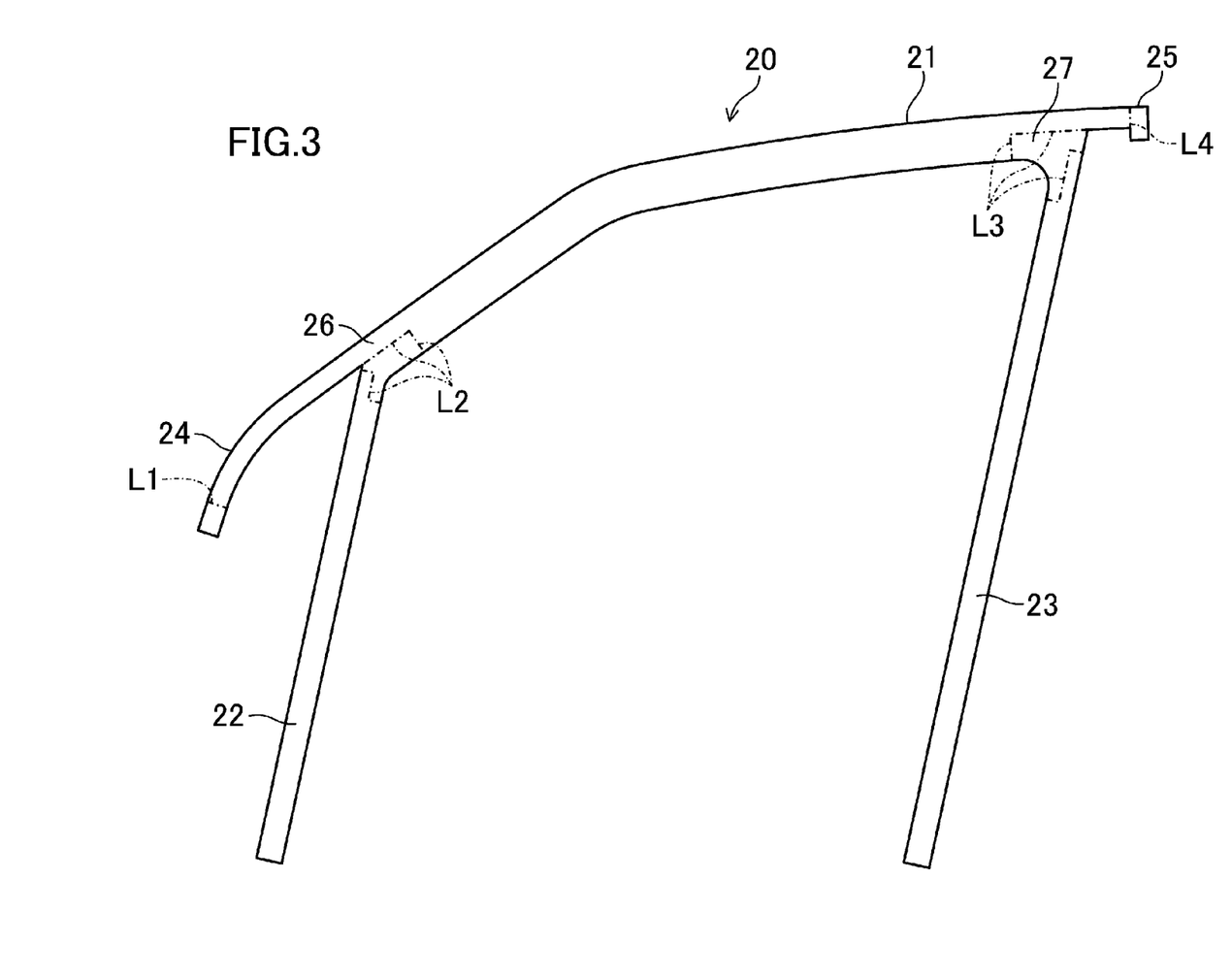
FIG. 3 is a left side view generally illustrating a shape of a glass run for the left-side front door.

FIG. 1 is a side view of a left-side front door (automobile door) 1 having a glass run (a glass run for automobile door) 20 for left-side front door according to an embodiment of the present disclosure, when viewed from outside a cabin (from the left). The left-side front door 1 is arranged at a front position on the left side of an automobile (not shown) to open and close an opening formed at the front position on the left side of the automobile. FIG. 3 illustrates the glass run 20 for left-side front door.

Figure 2:
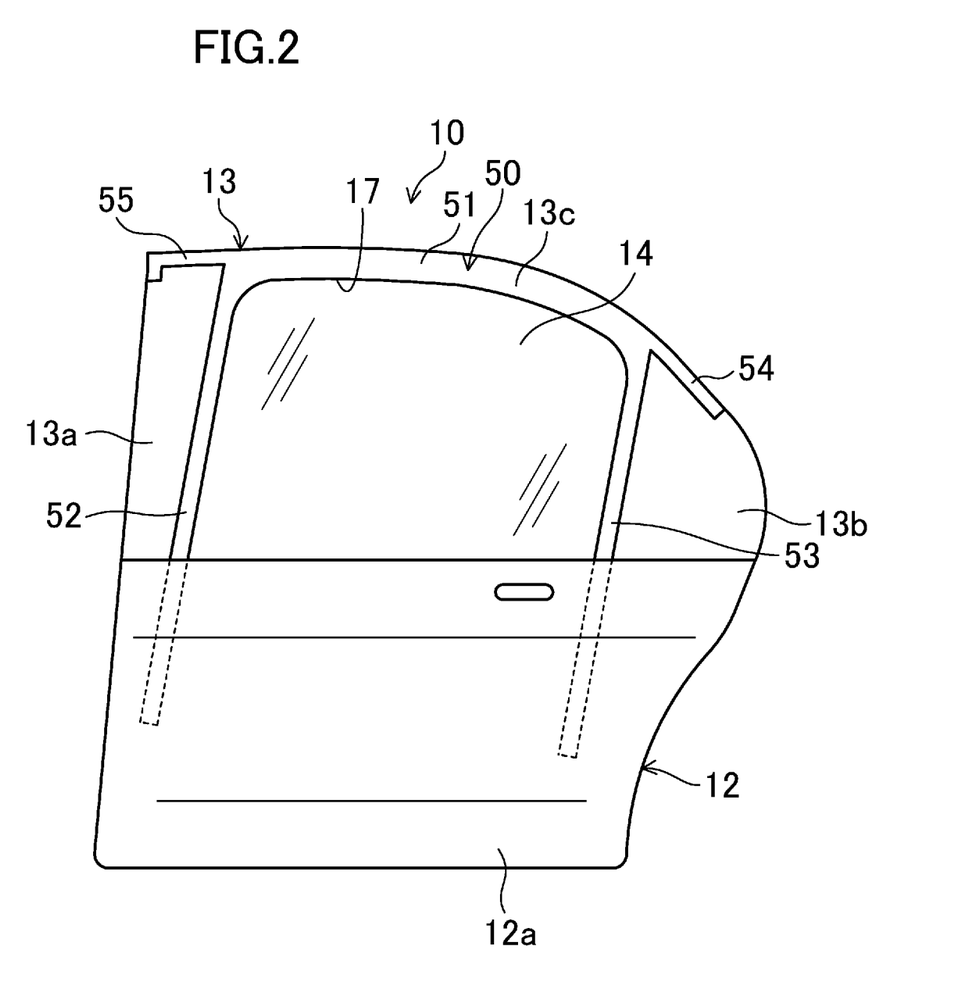
FIG. 2 is a left side view of a left-side rear door.
Figure 4:
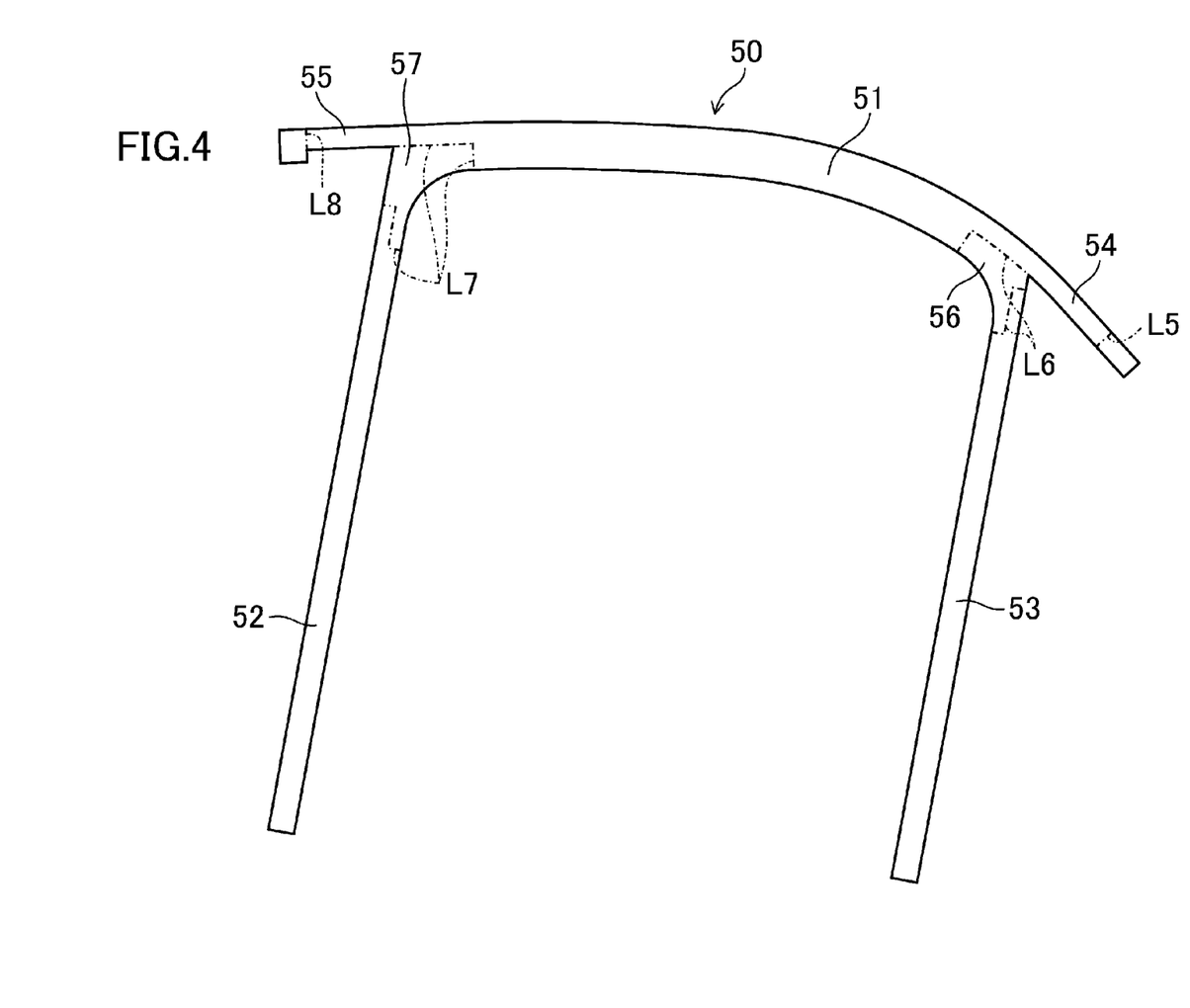
FIG. 4 is a left side view generally illustrating a shape of a glass run for the left-side rear door.

FIG. 2 is a side view of a left-side rear door (automobile door) 10 having a glass run (automobile glass run) 50 for left-side rear door, when viewed from the outside of a cabin (from the left). The left-side rear door 10 is arranged at a rear position on the left side of an automobile (not shown) to open and close an opening formed at the rear position on the left side of the automobile. FIG. 4 illustrates the glass run 50 for left-side rear door.

In the following description of the embodiments, front and rear sides of a vehicle may simply be referred to as the "front" and the "rear," respectively. Further, although not shown, a right-side front door is symmetrical to the left-side front door 1, and although not shown, a right-side rear door is symmetrical to the left-side rear door 10.

(Configuration for Door)

As illustrated in FIG. 1, the left-side front door 1 includes a door body 2 comprising substantially a lower half of the left-side front door 1, and a window frame 3 comprising substantially an upper half of the front door 1. Although not shown, a front edge portion of the door body 2 is attached to a pillar of the vehicle body via hinges having a vertically-extending rotational shaft. The door body 2 is comprised of an inner panel (not shown) and an outer panel 2a which are made of steel plate or other materials. The door body 2 is capable of housing a window glass 4 movable up and down and a lifting device (not shown) intended to move the window glass 4 up and down.

Figure 5:
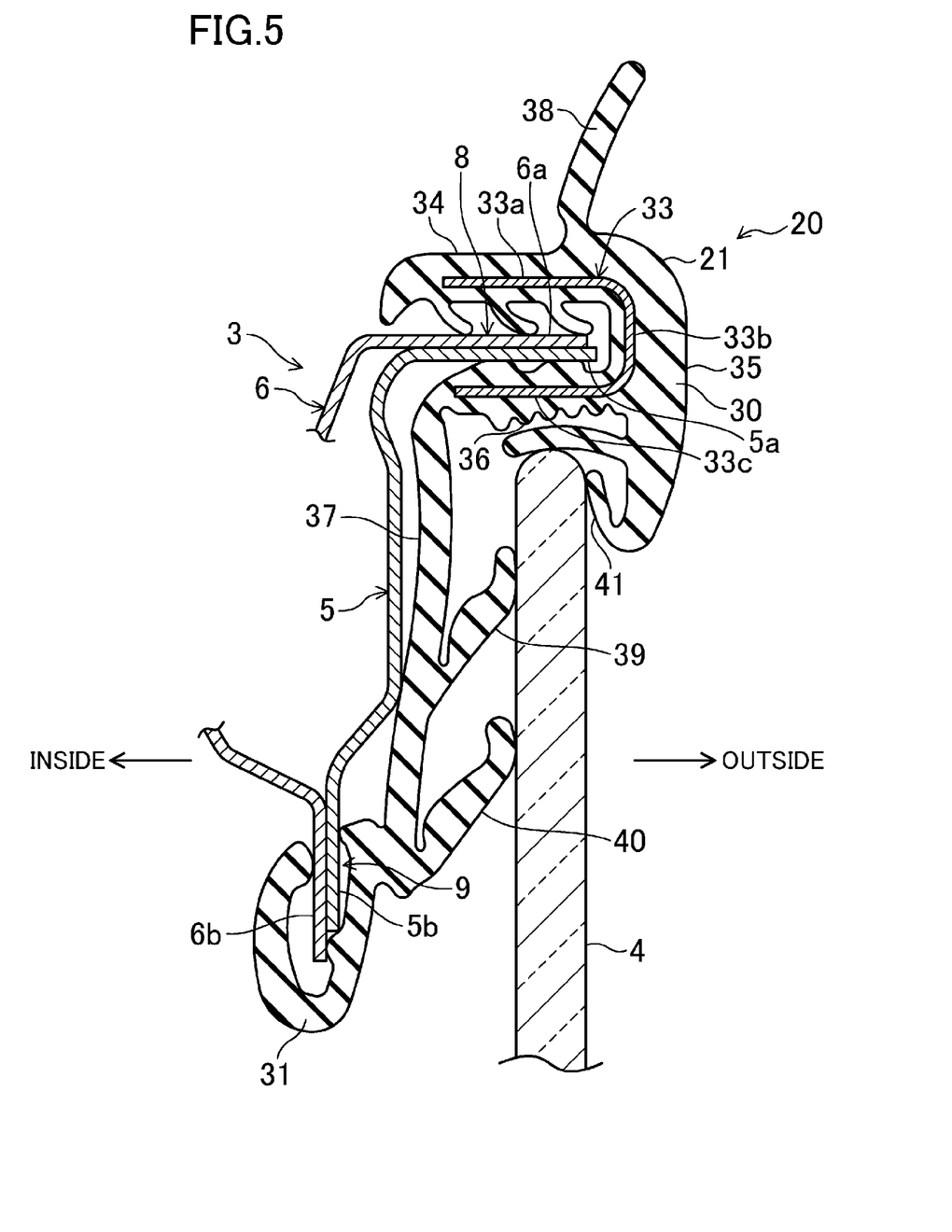
FIG. 5 is a cross-sectional view taken along the line V-V shown in FIG. 1.
Figure 6:
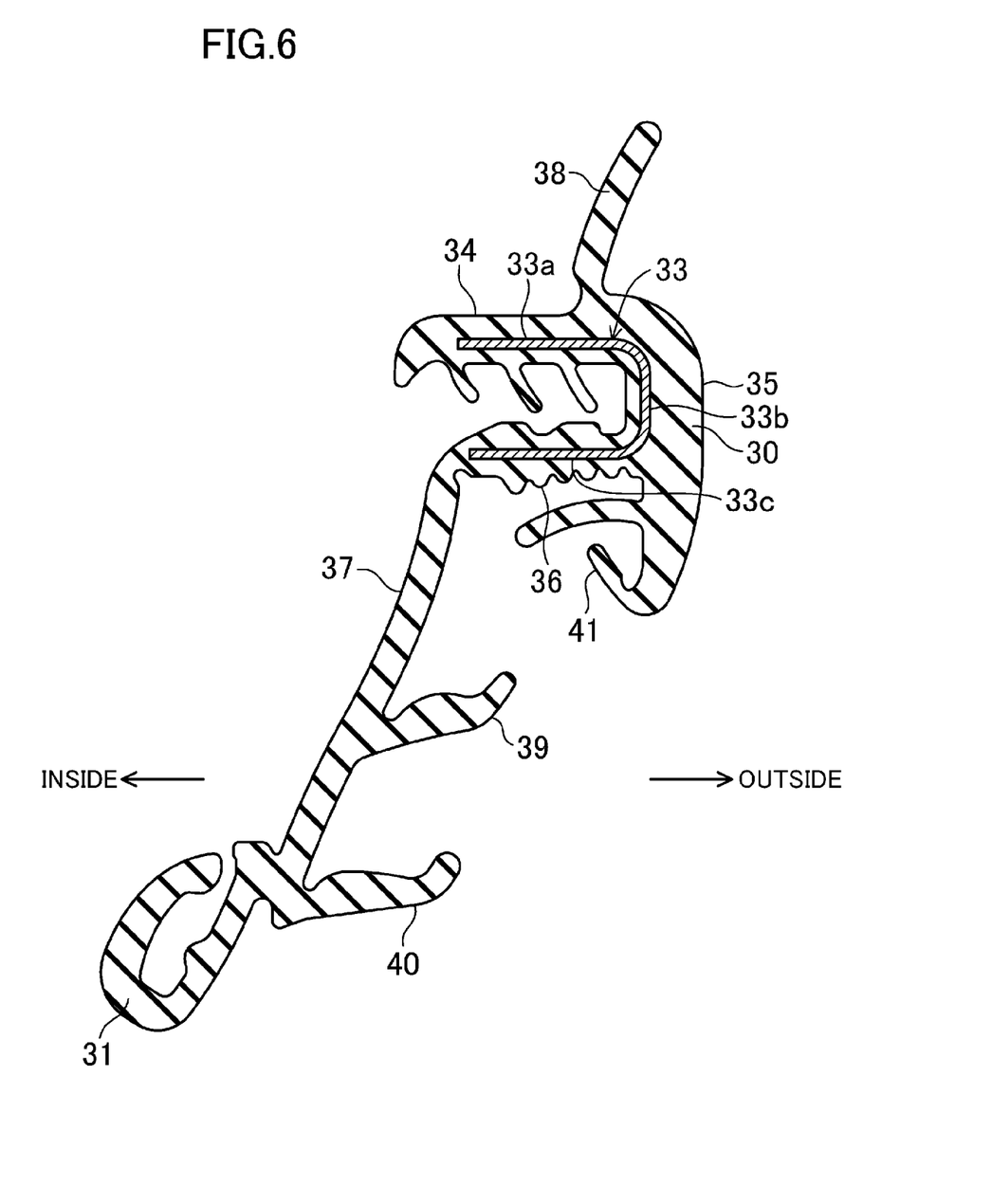
FIG. 6 is a cross-sectional view of the glass run for the left-side front door taken along the line V-V shown in FIG. 1.

The window frame 3 functions as a sash which holds a peripheral portion of the window glass 4 and defines a window opening 7. The window glass 4 opens and closes the window opening 7 defined by the window frame 3. The window frame 3 of this embodiment is comprised of an outer panel member 5 and an inner panel member 6 which are formed by press-molding a steel plate or any other material and assembled together as illustrated in FIG. 5. The window frame 3 may be formed by a roll forming method, for example.

As illustrated in FIG. 1, the window frame 3 includes a front frame portion 3a, a rear frame portion 3b, and an upper frame portion 3c. The front frame portion 3a protrudes upward from a front portion of an upper edge of the door body 2. The rear frame portion 3b extends upward from a rear portion of the upper edge of the door body 2. The rear frame portion 3b has an upper end located higher than an upper end of the front frame portion 3a. The upper frame portion 3c extends in a longitudinal direction of the vehicle body from the upper end of the front frame portion 3a to the upper end of the rear frame portion 3b along a roof edge portion (not shown) of the vehicle body. The entire upper portion of the window frame 3, from a front end to a rear end thereof, is comprised of the upper frame portion 3c.

The shape of the upper frame portion 3c is not limited to the one illustrated in the drawing. The upper frame portion 3c may have an upwardly-curved shape as a whole, and a position of a curved portion and/or an inclination angle of the upper frame portion 3c may be determined freely so as to correspond to the roof shape of the vehicle body.

A door mirror attachment portion 3d, to which a door mirror (not shown) is attached, is provided at a front portion of the front frame portion 3a of the window frame 3. The door mirror attachment portion 3d has an upper edge that is continuous with a front end portion of the upper frame portion 3c of the window frame 3.

As illustrated in FIG. 5, the window frame 3 includes a glass run attachment plate 8 extending toward the outside of the cabin, and an inner circumferential flange 9 protruding toward the center of the window opening 7 (illustrated in FIG. 1). Since the inner circumferential flange 9 protrudes toward the center of the window opening 7, the inner circumferential flange 9 protrudes downward from the upper frame portion 3c shown in FIG. 1. The front frame portion 3a and the rear frame portion 3b may have the same structure as the upper frame portion 3c. That is, the inner circumferential flange 9 protrudes rearward from the front frame portion 3a, and frontward from the rear frame portion 3b. Note that the front frame portion 3a and the rear frame portion 3b may have different structure from the upper frame portion 3c.

As illustrated in FIG. 5, the outer panel member 5 which forms the window frame 3 includes, at a portion closer to the center of the window opening 7, an inner plate portion 5b extending toward the center of the window opening 7. The inner panel member 6 includes, at a portion closer to the center of the window opening 7, an inner plate portion 6b extending toward the center of the window opening 7. The outer panel member 5 includes, at an outer peripheral portion of the window opening 7, an outer plate portion 5a extending toward the outside of the cabin. The inner panel member 6 includes, at an outer peripheral portion of the window opening 7, an outer plate portion 6a extending toward the outside of the cabin.

The inner circumferential flange 9 is formed by layering the inner plate portion 5b of the outer panel member 5 and the inner plate portion 6b of the inner panel member 6, and joining them to each other, in a widthwise direction of the vehicle. Further, the glass run attachment plate 8 is formed by layering the outer plate portion 5a of the outer panel member 5 and the outer plate portion 6a of the inner panel member 6, and joining them to each other, in a vertical direction.

Figure 7:
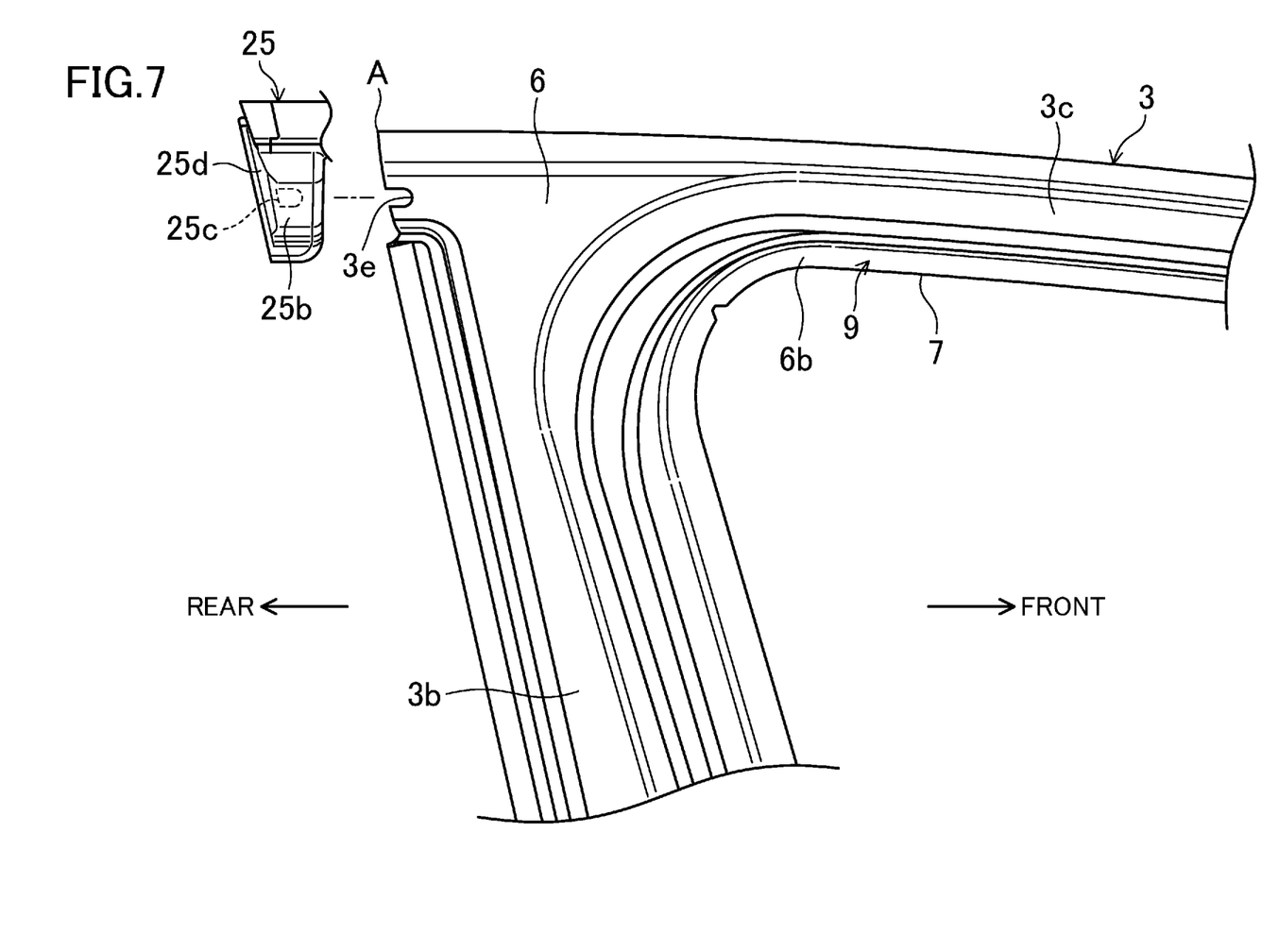
FIG. 7 is a side view of an upper portion of the left-side front door and a rear portion of the glass run when viewed from inside the cabin, illustrating a state right before the glass run is assembled to the left-side front door.
Figure 8:
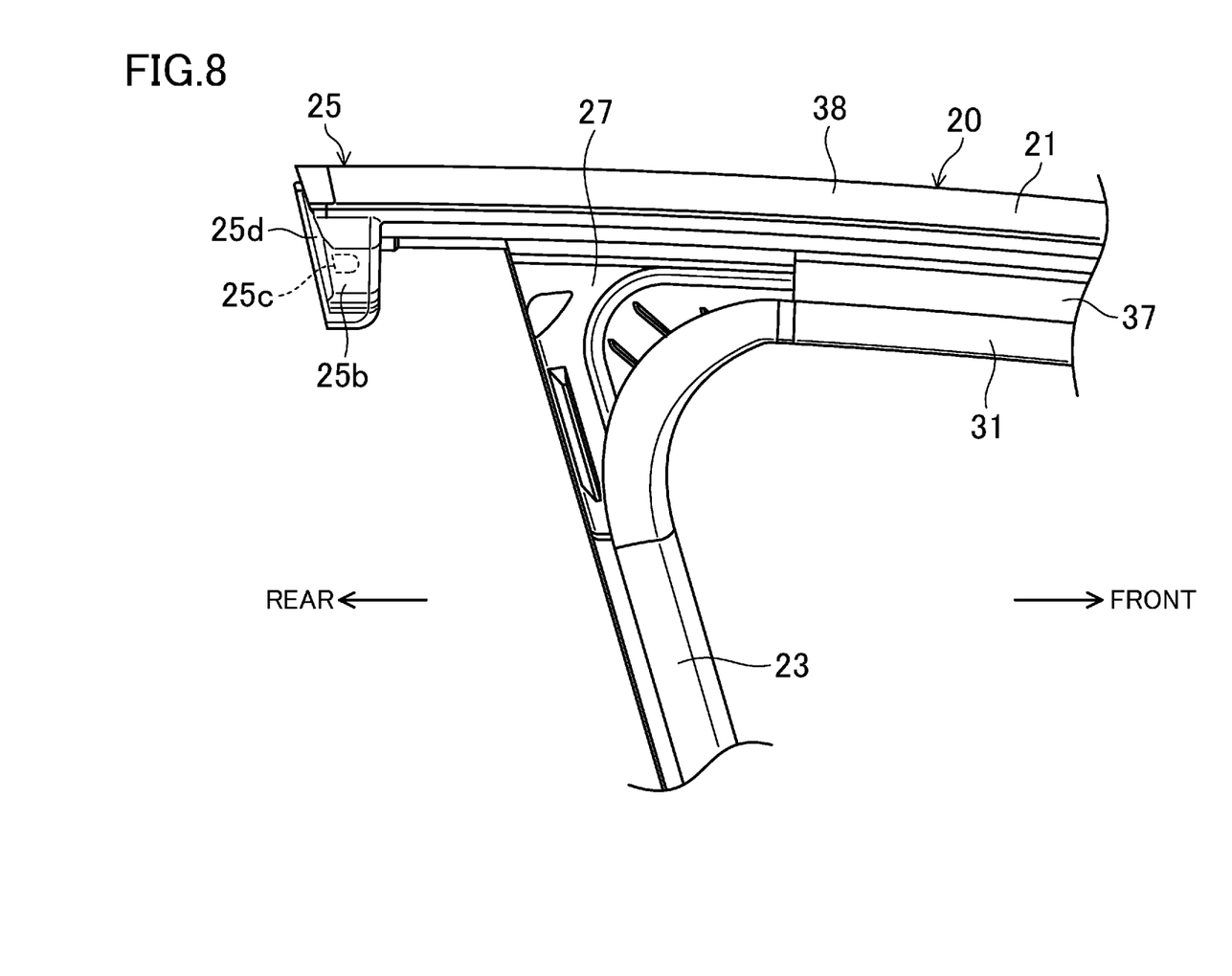
FIG. 8 is a side view of an upper portion of the glass run of the left-side front door when viewed from inside the cabin.
Figure 9:
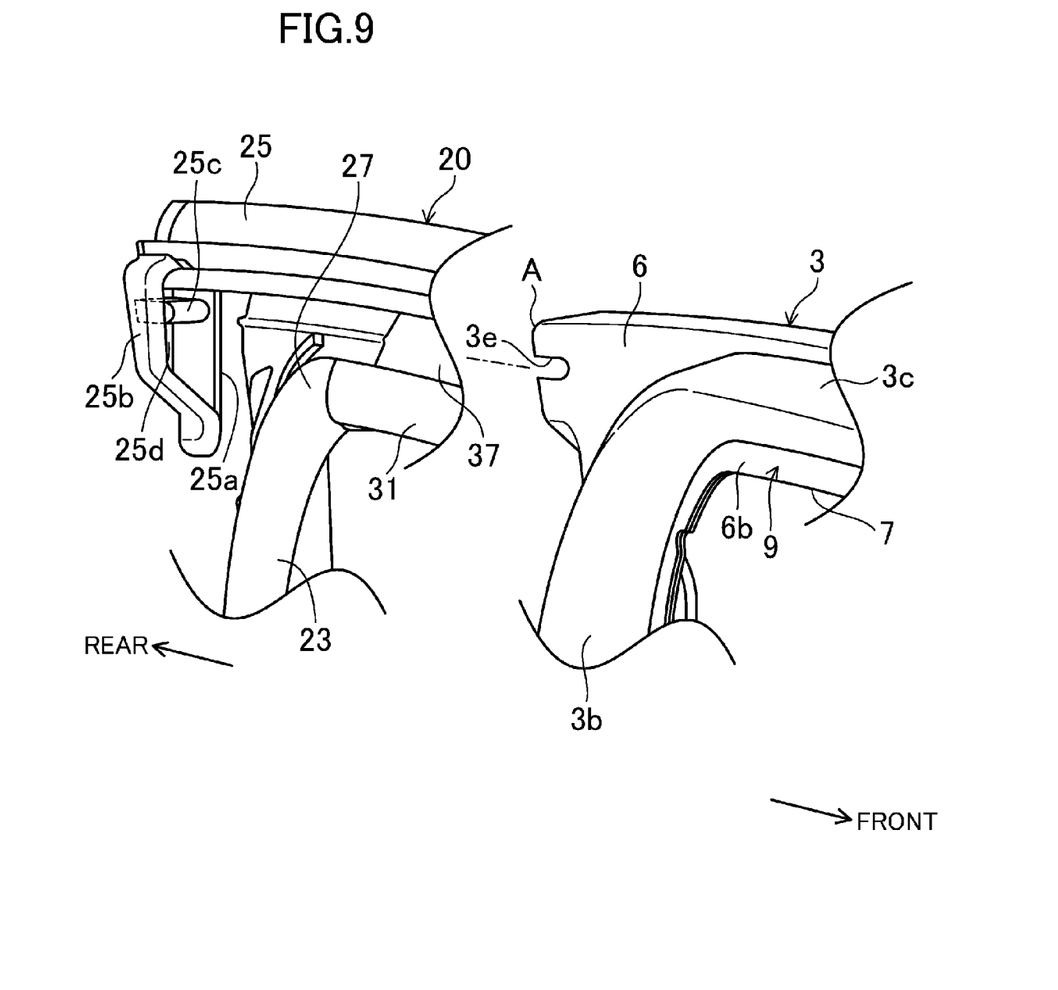
FIG. 9 is a perspective view of the upper portion of the left-side front door and the rear portion of the glass run when viewed from inside the cabin, illustrating the state right before the glass run is assembled to the left-side front door.

As illustrated in FIGS. 7 and 9, an angled portion A is formed at an upper rear end of the upper frame portion 3c of the window frame 3. A portion of the upper frame portion 3c of the upper portion 3 near the angled portion A is notched. Specifically, a rear edge portion of the outer panel member 5 and the inner panel member 6 which form the upper frame portion 3c of the window frame 3 is provided with a notch 3e spaced downward from the angled portion A. The notch 3e opens to the rear side (to the other side of the vehicle in the longitudinal direction thereof) and extends to the front side. The notch 3e is designed to have a generally uniform width (i.e., a generally uniform vertical dimension) rearward from a middle portion thereof in the longitudinal direction of the vehicle, and a reduced width forward from the middle portion. The portion where the notch 3e is formed, as well as a portion near the notch 3e, are a portion where the outer panel member 5 and the inner panel member 6 are not hemmed together.

The left-side rear door 10 has the same basic structure as the left-side front door 1. That is, as illustrated in FIG. 2, the left-side rear door 10 includes a door body 12 comprised of an inner panel (not shown) and an outer panel 12a, and a window frame 13. The window frame 13 includes a front frame portion 13a, a rear frame portion 13b, and an upper frame portion 13c. Although not shown, the window frame 13 of the left-side rear door 10, too, includes a glass run attachment plate extending toward the outside of the cabin, and an inner circumferential flange protruding toward the center of the window opening 17.

(Configuration for Glass Run)

As illustrated in FIG. 5, the glass run 20 for left-side front door is a so-called hidden type which covers and hides at least an outer side of the window frame 3, and functions as a seal which is assembled to the window frame 3 from outside the cabin to seal a gap between the window frame 3 and the window glass 4, which will be described in detail later. The glass run 20 for left-side front door covers the glass run attachment plate 8, which is a portion of the window frame 3 closer to the outside of the cabin, and the inner circumferential flange 9, which is a portion of the window frame 3 closer to the center of the window opening 7.

As illustrated in FIG. 3, the glass run 20 for left-side front door includes an upper glass run portion 21, a front vertical glass run portion 22, a rear vertical glass run portion 23, a front protrusion 24, and a rear protrusion 25. The upper glass run portion 21 extends in the lengthwise direction of the vehicle along the upper frame portion 3c of the window frame 3. The front vertical glass run portion 22 extends downward from a front end portion of the upper glass run portion 21 along the front frame portion 3a of the window frame 3. The rear vertical glass run portion 23 extends downward from a rear end portion of the upper glass run portion 21 along the rear frame portion 3b of the window frame 3. As illustrated in FIG. 1, lower portions of the front vertical glass run portion 22 and rear vertical glass run portion 23 reaches the inside of the door body 2.

A front corner 26 is formed at a boundary between the front end of the upper glass run portion 21 and the front vertical glass run portion 22. The front protrusion 24 protrudes forward from the front corner 26, and is tilted down as a whole as it is closer to the tip end. The front corner 26 extends along the upper edge of the door mirror attachment portion 3d. Further, a rear corner 27 is formed at a boundary between the rear end of the upper glass run portion 21 and the rear vertical glass run portion 23. The rear protrusion 25 protrudes rearward from the rear corner 27 along the upper frame portion 3c of the window frame 3. The rear protrusion 25 has a rear end that extends to reach a rear end of the upper frame portion 3c.

The dot-dash lines L1-L4 in FIG. 3 indicate boundaries between extrusion-molded portions and die-molded portions. A portion of the front protrusion 24 closer to the front than the dot-dash line L1 is a die-molded portion. A portion of the front corner 26 surrounded by the dot-dash line L2 is a die-molded portion. A portion of the rear corner 27 surrounded by the dot-dash lines L3 and L4 is a die-molded portion. Portions other than these portions are extrusion-molded portions. To fabricate the glass run 20 for left-side front door, extrusion-molded portions are formed first, and die-molded portions are integrally formed with the extrusion-molded portions, thereby obtaining an integrally-formed product having a shape shown in FIG. 3.

FIG. 4 illustrates a glass run 50 for left-side rear door, which has the same basic structure as the glass run 20 for left-side front door. The glass run 50 includes an upper glass run portion 51, a front vertical glass run portion 52, a rear vertical glass run portion 53, a rear protrusion 54, and a front protrusion 55. A portion of the rear protrusion 54 closer to the rear than the dot-dash line L5 is a die-molded portion. A portion of the rear corner 56 surrounded by the dot-dash line L6 is a die-molded portion. A portion of the front corner 57 surrounded by the dot-dash lines L7 and L8 is a die-molded portion. Portions other than these portions are extrusion-molded portions.

As illustrated in FIG. 5, the upper glass run portion 21 of the glass run 20 for left-side front door includes a glass run body 30 assembled to the glass run attachment plate 8 of the window frame 3, and an inner decorative lip 31 integrally formed with the glass run body 30. The glass run body 30 is provided with a core 33. The core 33 and the rest of the glass run body 30 except the core 33 are made of different materials. Specifically, the core 33 may be made, for example, of a rigid resin (e.g., a resin containing talc or glass fibers), an aluminum alloy, steel, stainless steel, etc. The rest of the glass run body 30 except the core 33 may be made of an elastic material softer than the core 33 such as EPDM (ethylene-propylene-diene rubber) and TPO (thermoplastic olefin elastomer). The inner decorative lip 31 may be made of the EPDM, TPO, and other materials. The EPDM and/or TPO may be a foamed material or a solid material.

The core 33 includes an upper plate portion 33a extending toward the outside of the cabin, an end plate portion 33b extending downward from an outer end, in the widthwise direction of the vehicle, of the upper plate portion 33a, and a lower plate portion 33c extending from a lower end of the end plate portion 33b to the inside of the cabin generally parallel with the upper plate portion 33a. The core 33 is made of a member having an approximately C-shaped cross section open to the inside of the cabin.

The upper glass run portion 21 of the glass run body 30 includes an upper seal plate portion 34, an outer plate portion 35, a lower seal plate portion 36, and an extended plate portion 37, which are integrally formed with one another. The upper seal plate portion 34 extends, in the widthwise direction of the vehicle, along the upper surface of the glass run attachment plate 8 of the window frame 3. The outer plate portion 35 extends downward from an outer end, in the widthwise direction of the vehicle, of the upper seal plate portion 34. The lower seal plate portion 36 extends from a lower end of the outer plate portion 35 toward the inside of the cabin along the lower surface of the glass run attachment plate 8 of the window frame 3. The upper seal plate portion 34, the outer plate portion 35, and the lower seal plate portion 36 form an approximately square C-shaped cross section open to the inside of the cabin. The glass run attachment plate 8 of the window frame 3 is covered with the upper seal plate portion 34, the outer plate portion 35, and the lower seal plate portion 36 from outside the cabin. The core 33 is buried in the upper seal plate portion 34, the outer plate portion 35, and the lower seal plate portion 36. An upper seal lip 38 protrudes upward from the upper seal plate portion 34. The upper seal lip 38 comes in contact with the periphery of the opening of the vehicle body.

The extended plate portion 37 extends from an inner end, in the widthwise direction of the vehicle, of the lower seal plate portion 36 along the inner surface of the window glass 4. The extended plate portion 37 covers the outer panel member 5. A first inner seal lip 39 and a second first inner seal lip 40 are provided on an outer surface, in the widthwise direction of the vehicle, of the extended plate portion 37, to be apart from each other in the vertical direction. The first inner seal lip 39 and the second first inner seal lip 40 come into contact with the inner surface of the window glass 4. An outer seal lip 41 protrudes upward from a lower end of the outer plate portion 35. The outer seal lip 41 comes into contact with an outer surface, in the widthwise direction of the vehicle, of the window glass 4.

The inner decorative lip 31 extends from a lower end of the extended plate portion 37 toward the inside of the cabin, and is then bent upward. The inner decorative lip 31 covers the inner circumferential flange 9 of the window frame 3.

As is also illustrated in FIG. 9, provided integrally at a rear portion of the rear protrusion 25 of the glass run 20 for left-side front door are: an outer cover 25a which covers an outer side, in the widthwise direction of the vehicle, of the angled portion A at an upper portion of the window frame 3; an inner cover 25b which covers an inner side, in the widthwise direction of the vehicle, of the angled portion A; a connecting portion 25c extending from the outer cover 25a to the inner cover 25b to connect the outer cover 25a and the inner cover 25b; and an end cover 25d. In order to cover at least a portion where the notch 3e is formed from near the angled portion A of the upper frame portion 3c of the window frame 3, the outer cover 25a has a lower end located lower than the portion where the notch 3e is formed. The inner cover 25b is located away from the outer cover 25a toward the inside of the cabin. In order to cover at least the portion where the notch 3e is formed from near the angled portion A of the upper frame portion 3c of the window frame 3, the inner cover 25b has a lower end located lower than the portion where the notch 3e is formed.

The end cover 25d extends from a rear end of the outer cover 25a to a rear end of the inner cover 25b. The end cover 25d connects the rear end of the outer cover 25a and the rear end of the inner cover 25b, forming a front opening cover comprised of the outer cover 25a, the inner cover 25b, and the end cover 25d and opening frontward. The end cover 25d covers the rear end of the upper frame portion 3c of the window frame 3. A lower end of the outer cover 25a and a lower end of the inner cover 25b are not connected to each other, so that the outer panel member 5 and the inner panel member 6 which form the upper frame portion 3c may be inserted in a gap between the lower end of the outer cover 25a and the lower end of the inner cover 25b.

The connecting portion 25c is inserted in the notch 3e of the window frame 3, thereby being assembled to the window frame 3. Specifically, the connecting portion 25c is positioned at vertically middle portions of the outer cover 25a and the inner cover 25b, and has a columnar (wall) shape extending in the widthwise direction of the vehicle. The connecting portion 25c is formed at a position corresponding to the position where the notch 3e of the window frame 3 is formed. The connecting portion 25c has a vertical cross section, the shape of which is approximately the same as the shape of the periphery of the notch 3e. Thus, the connecting portion 25c inserted in the notch 3e of the window frame 3 is fitted to the periphery of the notch 3e. The vertical dimension of the connecting portion 25c decreases toward the front side of the connecting portion 25c.

The dimension of the connecting portion 25c in the longitudinal direction of the vehicle may be generally equal to, or may be shorter than, the dimension of the notch 3e in the longitudinal direction of the vehicle.

The connecting portion 25c is integrally formed with the end cover 25d. Thus, the connecting portion 25c may be reinforced by the end cover 25d, while the end cover 25d may be reinforced by the connecting portion 25c. The connecting portion 25c may be located apart from the end cover 25d to be closer to the front of the vehicle.

(Glass Run Assembly Method)

Now, a method for assembling the glass run 20 for left-side front door configured as described above to the left-side front door 1 will be described. As illustrated in FIGS. 7 and 9, which illustrate a state right before the assembly, the rear end of the upper frame portion 3c of the window frame 3 is located in front of the rear protrusion 25 of the glass run 20 for left-side front door. Then, the notch 3e of the upper frame portion 3c and the connecting portion 25c of the rear protrusion 25 are adjusted to approximately the same level. After that, the glass run 20 for left-side front door is moved forward toward the upper frame portion 3c. As the movement proceeds, the rear portion of the upper frame portion 3c is inserted into a space between the outer cover 25a and the inner cover 25b of the rear protrusion 25 from where the outer cover 25a and the inner cover 25b are not connected to each other, and the connecting portion 25c is inserted in the notch 3e. Since the vertical dimension of the connecting portion 25c decreases toward the front side, the front portion of the connecting portion 25c may be easily inserted in the notch 3e even if the notch 3e and the connecting portion 25c are slightly misaligned. The glass run 20 for left-side front door becomes assembled to the upper frame portion 3c when the connecting portion 25c is completely inserted in the notch 3e, that is, the connecting portion 25c is fitted to the periphery of the notch 3e and becomes assembled to the upper frame portion 3c. At the assembly, the glass run attachment plate 8 of the window frame 3 is inserted in the glass run body 30, and the inner decorative lip 31 is positioned so as to cover the inner circumferential flange 9 of the window frame 3.

Advantages of First Embodiment

As described above, according to the first embodiment, the angled portion A at the upper part of the window frame 3 may be covered by the outer cover 25a and inner cover 25b of the glass run 20 for left-side front door. Also, the connecting portion 25c, which connects the outer cover 25a and the inner cover 25b, may be inserted in, and assembled to, the notch 3e of the window frame 3. Thus, the outer cover 25a is less likely to be detached from the window frame 3 even when, for example, a hand is placed on the outer cover 25a to apply force to the door 1 to open and close the door, since the outer cover 25a is connected to the inner cover 25b via the connecting portion 25c, which is assembled to the window frame 3. Similarly, the inner cover 25b is less likely to be detached from the window frame 3 even when, for example, a hand is placed on the inner cover 25b to apply force to the door 1 to open and close the door, since the inner cover 25b is connected to the outer cover 25a via the connecting portion 25c, which is assembled to the window frame 3.

That is, the outer cover 25a and the inner cover 25b are not easily detached from the window frame 3 without requiring clips and an adhesive tape, which can ensure safety and good appearance while reducing the number of components and costs. Further, there is no concern about degradation of adhesion over time as in the case where the adhesive tape is used.

Since the connecting portion 25c is assembled to the notch 3e formed at the panel members 5, 6 comprising the window frame 3, it is possible to assemble the outer and inner covers 25a and 25b and the connecting portion 25c to the single member (i.e., the panel members 5, 6) smoothly and hence to further improve the workability in assembly.

Further, the gap between the outer cover 25a and the inner cover 25b is open to the front side (to one side of the vehicle in the longitudinal direction thereof), and the notch 3e is formed in the panel members 5, 6 so as to open to the rear side (to the other side of the vehicle in the longitudinal direction thereof). Thus, when assembling the outer and inner covers 25a and 25b to the panel members 5, 6, the connecting portion 25c can be inserted in, and assembled to the notch 3e from the same direction in which the panel members 5, 6 are inserted in the gap between the outer and inner covers 25a, 25b. Consequently, the workability in assembly may be further improved.

The glass run 50 for left-side rear door may have the same configuration. Specifically, although not shown, the front protrusion 55 of the glass run 50 for left-side rear door is provided with outer and inner covers which cover an angled portion at an upper front part of the left-side rear door 10, and a connecting portion which connects the outer cover and the inner cover. A notch (not shown) is formed at the front frame portion 13a of the left-side rear door 10. The connecting portion of the glass run 50 for left-side rear door is inserted in, and assembled to, the notch of the left-side rear door 10. In this structure, the outer and inner covers of the glass run 50 for left-side rear door are not easily detached from the window frame 13, which can ensure safety and good appearance.

Second Embodiment

Figure 10:
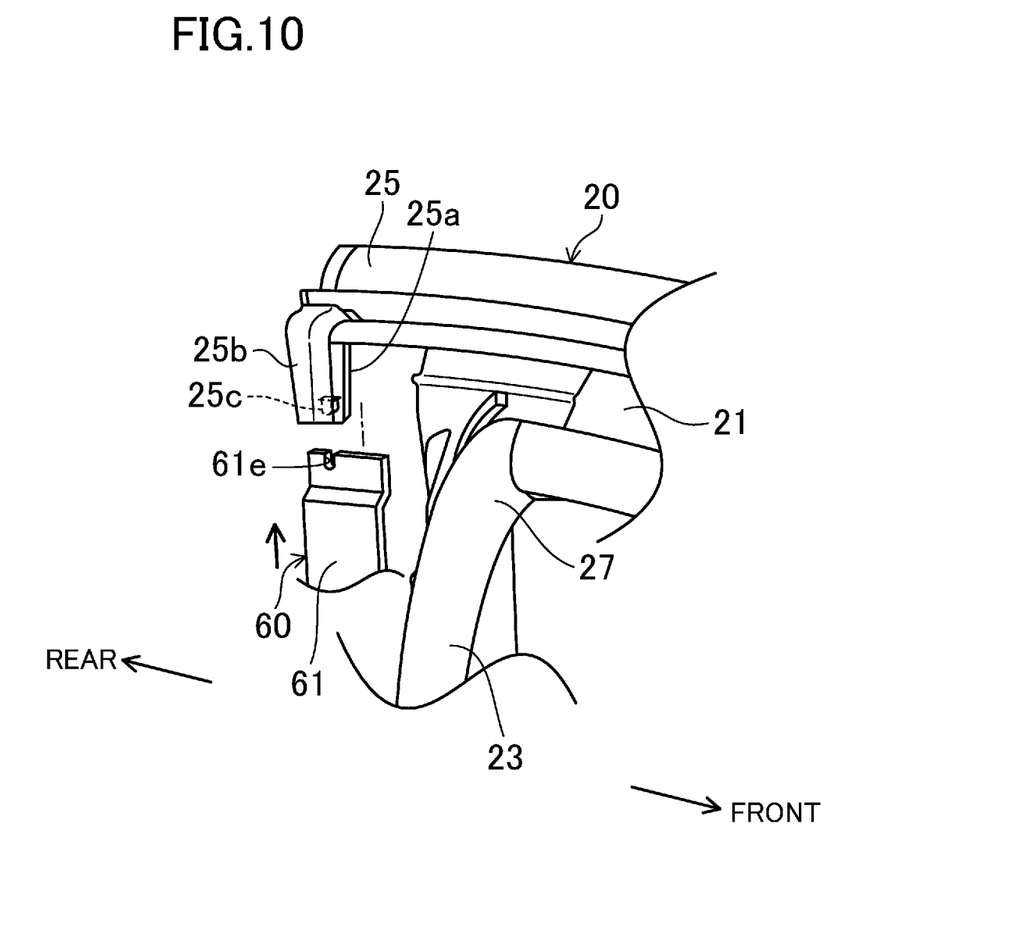
FIG. 10 is a perspective view directed to a second embodiment, illustrating a state right before a garnish is assembled.

FIG. 10 is a perspective view according to a second embodiment of the present disclosure. The second embodiment differs from the first embodiment in that a resin garnish 60 is provided on an outer side, in the widthwise direction of the vehicle, of the window frame 3, and that an outer cover 25a and an inner cover 25b of the glass run 20 for left-side front door are fixed to this garnish 60. In the following description, the same elements as those in the first embodiment are given the same reference characters, and the explanation thereof is omitted and elements different from those in the first embodiment will be described in detail.

The garnish 60 is a member for covering an outer surface, in the widthwise direction of the vehicle, of the rear frame portion 3b of the window frame 3, and has a long side extending vertically along the rear frame portion 3b and is fixed to the rear frame portion 3b. FIG. 10 illustrates only part of the garnish 60.

The garnish 60 includes an inner plate portion 61 bent to be located on an inner side, in the widthwise direction of the vehicle, of the rear frame portion 3b. The inner plate portion 61 covers the inner side, in the widthwise direction of the vehicle, of the rear frame portion 3b. A notch 61e is formed at an upper portion of the inner plate portion 61. The notch 61e opens upward and extends downward. The notch 61e is designed to have a generally uniform width (i.e., a generally uniform dimension in the longitudinal direction of the vehicle) upward from a vertical middle portion thereof, and a reduced width downward from the vertical middle portion.

The connecting portion 25c of the rear protrusion 25 of the glass run 20 for left-side front door is formed at a position corresponding to the position where the notch 61e is formed. The connecting portion 25c has a vertically-elongated cross section, and the dimension, in the longitudinal direction of the vehicle, of the connecting portion 25c decreases toward the lower end of the connecting portion 25c.

In the second embodiment, the inner plate portion 61 of the garnish 60 is inserted in a gap between the outer cover 25a and the inner cover 25b of the rear protrusion 25 of the glass run 20 for left-side front door from below. FIG. 10 illustrates a state right before the insertion. When the garnish 60 is moved upward in the arrow direction from this state, the connecting portion 25c of the glass run 20 for left-side front door is inserted in, and assembled to, the notch 61e of the garnish 60, although not shown. The garnish 60 is fixed to the rear frame portion 3b of the window frame 3 after the connecting portion 25c of the glass run 20 for left-side front door is inserted in the notch 61e of the garnish 60.

According to the second embodiment, the angled portion A at the upper part of the window frame 3 may be covered by the outer cover 25a and the inner cover 25b of the glass run 20 for left-side front door. Also, the connecting portion 25c, which connects the outer cover 25a and the inner cover 25b, is inserted in, and assembled to, the notch 61e of the garnish 60. Since the garnish 60 is fixed to the window frame 3, the outer cover 25a and the inner cover 25b are less likely to be detached from the window frame 3. That is, the outer cover 25a and the inner cover 25b are not easily detached from the window frame 3 without requiring clips and an adhesive tape, which can ensure safety and good appearance while reducing the number of components and costs.

The embodiments have been described as examples in all respects, and the present disclosure should not be limited to those exemplary embodiments. Any variations or modifications falling within the range of equivalents to the claims to be described below are all encompassed within the scope of the present disclosure.

As can be seen from the foregoing description, a glass run for automobile according to the present disclosure can be assembled, for example, to a window frame from outside a cabin.

What is claimed is:

1. A glass run for an automobile door, the glass run being assembled to a window frame, which forms a window opening of the automobile door, from an outside of a cabin to seal a gap between the window frame and a window glass, the glass run comprising:
   an upper portion extending in a longitudinal direction of a vehicle along an upper part of the window frame;
   a vertical portion extending downward from an end, in the longitudinal direction of the vehicle, of the upper portion; and
   a protruding portion protruding in the longitudinal direction of the vehicle from a corner formed at a boundary between the upper portion and the vertical portion along the upper part of the window frame,
   wherein:
   the protruding portion includes:
      an outer cover covering an outside, in a widthwise direction of the vehicle, of an angled portion at the upper part of the window frame;

an inner cover covering an inside, in the widthwise direction of the vehicle, of the angled portion at the upper part of the window frame; and a connecting portion extending from the outer cover to the inner cover to connect the outer cover and the inner cover to each other, and the connecting portion is inserted in, and assembled to, a notch formed at a door member comprising the automobile door.

2. The glass run of claim 1, wherein:

the door member is a panel member comprising the window frame, and the notch is formed at the panel member.

3. The glass run of claim 2, wherein:

a gap between the outer cover and the inner cover is open to one side of the vehicle in the longitudinal direction, and the notch formed at the panel member is open to the other side of the vehicle in the longitudinal direction.

4. The glass run of claim 1, wherein:

the door member is a garnish attached to the window frame, and the notch is formed at the garnish.

5. The glass run of claim 1, wherein the connecting portion is formed so as to be fitted to a periphery of the notch.

* * * * *